May 7, 1957  J. JANES  2,791,426
PIN-SETTING MACHINE
Filed Feb. 2, 1956  7 Sheets-Sheet 4

Inventor:
Joseph Janes,
Arthur D. Thomson Attorney

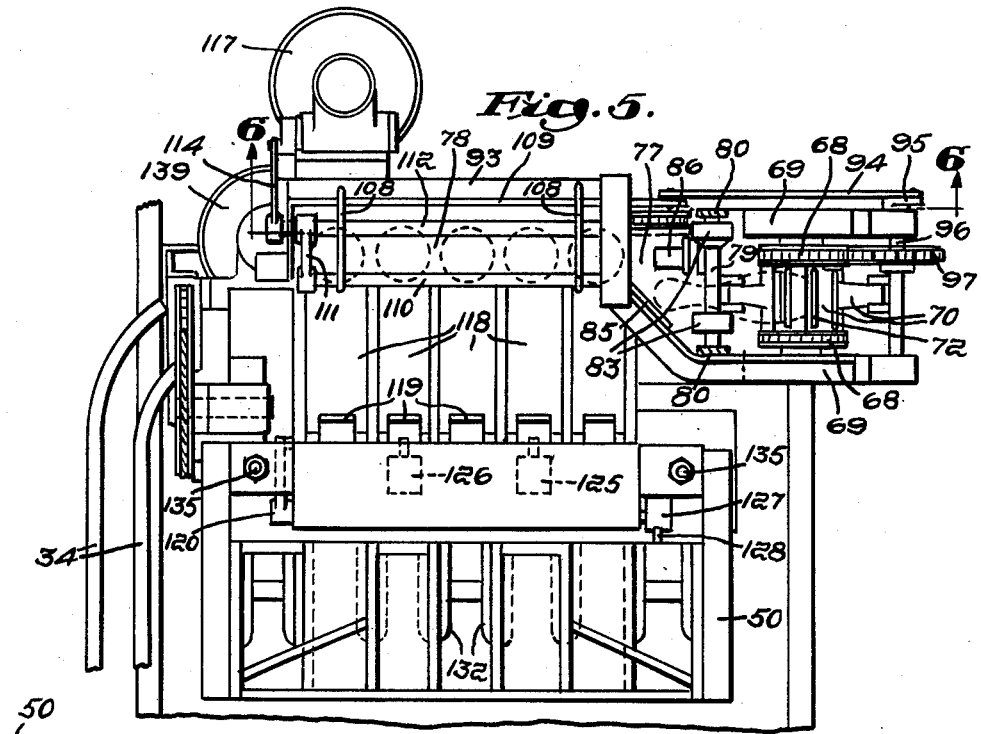

May 7, 1957    J. JANES    2,791,426
PIN-SETTING MACHINE
Filed Feb. 2, 1956    7 Sheets-Sheet 6
Fig. 11.
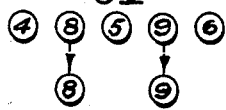
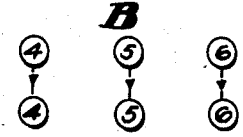
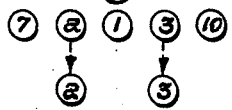
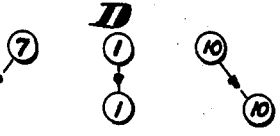
Fig. 12. Fig. 13.
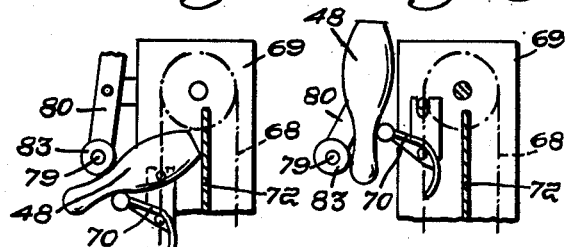
Fig. 14. Fig. 15.
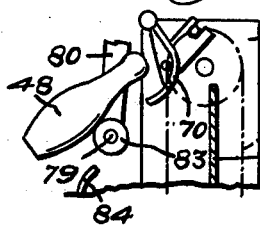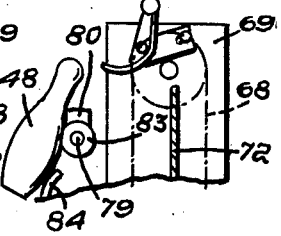
Fig. 16. Fig. 17.
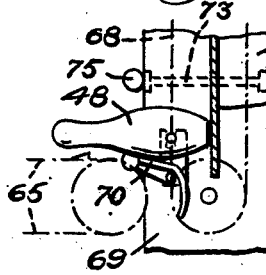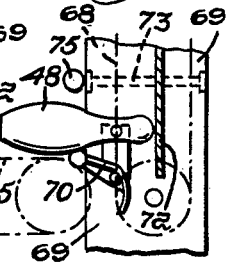
Fig. 20.
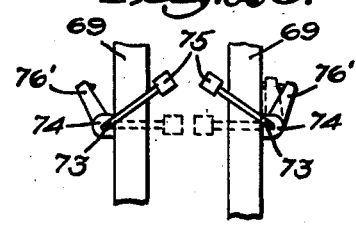
Fig. 18. Fig. 19.
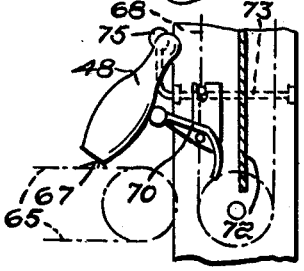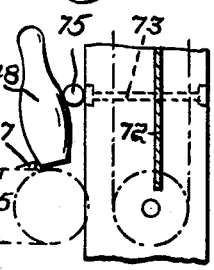
Inventor:
Joseph Janes,
by Arthur D. Thomson
Attorney Inventor:
Joseph Janes,
by Arthur D. Thomson
Attorney

United States Patent Office 2,791,426
Patented May 7, 1957

2,791,426
PIN-SETTING MACHINE
Joseph Janes, Arlington, Mass.

Application February 2, 1956, Serial No. 563,067

25 Claims. (Cl. 273—43)

This invention relates to pin-setting machines for bowling alleys, and pertains more particularly to improvements in automatic machines for setting and resetting the bottle-shaped types of bowling pins known as duckpins and tenpins in the United States, and fivepins in Canada.

All such pins are characterized by relatively wide, bulging bottom or base portions, constricted necks and relatively narrow, rounded tops, as compared to the symmetrically shaped candle type pins which may be set either end up. When bowling with such bottle-shaped pins, any dead wood remaining on the alley after a ball is rolled must be removed before the next ball is thrown, without disturbing the pins which remain standing. In tenpins, two balls are rolled for each frame, unless the first ball scores a strike, and, in duckpins, three balls are rolled, unless the first ball scores a strike or the second ball scores a spare.

It is accordingly the principal purpose of the invention to provide an efficient, automatic machine which will initially set such pins in the conventional pattern on the alley, clear the dead wood into the pit at the end of the alley after each ball is rolled, transfer the spent balls to the runway leading back to the bowler's station, convey the spent pins to an overhead aligning rack, then to pin chutes, and thence to a magazine where they are arranged in proper pattern, re-set the standing pins for the next ball, and finally restore the initial setting of all the pins after all balls required for each scoring frame or box have been rolled. These operations are successively performed by the actuation of automatic electrical controls, once the machine has been started by pressing a starting button.

One of the principal features of novelty of the improved machine resides in the provision of a hinged platform or tray at the extreme end of the alley proper, on which the pins are set and are held magnetically in position during movement of the platform which swings to vertical position to receive the pins from delivery chambers of the magazine, in which they are arranged horizontally in properly spaced relation for the desired pattern, and which then swings downwardly to horizontal position, flush with the surface of the alley, with the upright pins correctly located for play. Pin-holding electromagnets are located under a metal plate of the tray, and the magnets are automatically energized when the platform is moving to dump dead wood, or is in position to receive a new set of pins from the magazine, and automatically de-energized when the tray is in horizontal position. The bases of the pins preferably have metal washers or plugs which are attracted by the magnetized tray.

Another feature is the provision of a vertically movable magazine having locating chambers which successively receive two sets of five pins each from a series of chutes in which they are temporarily retained; one set of said pins being deposited in the magazine while it is near its uppermost position, and the second set being deposited while it is in an intermediate position during its descent. The ten pins are thus properly arranged to be removed from the chambers by magnetic attraction of the up-tilted tray, when the magazine is at lowermost position. The chutes receive the pins from an overhead rack into which they are automatically conveyed. Each chute successively receives two pins from the rack, and is equipped with automatically controlled stops or gates which release one pin at a time, when the magazine is in proper position to receive the respective pins in the appropriate chambers.

A third feature resides in the operation of the overhead pin rack which receives five pins from an elevator, aligns them for delivery to the chutes and automatically dumps them into the chutes, base foremost, in successive groups of five pins each.

A fourth feature is the provision of pin-elevating mechanism which receives pins, base-foremost, from the pit, and rejects pins which enter the elevator top-foremost; which successively carries the pins up to the level of the rack conveyor; and which then tumbles the successive pins on to the rack, in upright position.

The machine also comprises means for conveying bowling balls and pins to the back of the pit; transferring the balls to an elevator at one side of the pit and thence to the ball return runway, and transferring the dead pins to the pin elevator at the opposite side of the pit; but such mechanisms are not emphasized as features of the improved machine. The motors, switches and electrical controls for automatically operating the various major mechanisms of the machine in sequence are of conventional construction and need not be detailed, but the circuit is diagrammed and a later explanation of its novel features will indicate that the bowler need press a push button only once, at the start of each frame or box, to set the sequence in operation.

The aforesaid features of the pin-setting machine, and other advantages of its construction and operation will now be more fully described in connection with the accompanying drawings showing a recommended embodiment of the invention, and will be pointed out in the appended claims. It will be understood, however, that the structural details of the machine herein illustrated and described may be varied to suit particular installations, as well as to accommodate the various sizes of bottle-shaped pins for playing fivepins, as well as tenpins or duckpins, without departing from the essence of the invention as set forth in the claims. The machine herein disclosed is designed for setting duckpins or tenpins but it will be understood that it may be readily modified to set fivepins in an appropriate pattern by changing the number and spacing of the magazine chambers so that the magazine will receive and hold five pins rather than ten pins.

In the drawings:

Fig. 5 is a fragmentary plan view, showing the magazine elevated as in Fig. 3;

Fig. 6 is a detailed view, taken on line 6—6 of Fig. 5, showing the pin rack and its pusher bar, with certain associated mechanism omitted for the sake of clarity;

Fig. 7 is a fragmentary detail on line 7—7 of Fig. 6;

Fig. 8 is an enlarged fragmentary detail of a tripping device shown in Fig. 5, for releasing the chute gate shown in Fig. 4;

Fig. 9 is an enlarged elevation of a bottle-shaped bowling pin, partly in section to show a metal washer fixed in its base;

Fig. 10 is an enlarged fragmentary elevation of a portion of the pin elevator, showing one of the pin-supporting plates or brackets;

Fig. 11 is a composite diagram indicating the order in which the pins, in successive sets of five each, drop from the pin chutes into the compartments of the magazine, as the latter is descending;

Figs. 12–15 are detail views of the mechanism for tumbling a pin from the top of the elevator onto the rack, showing successive positions of the pin at successive stages of the operation of the elevator and tumbling devices;

Fig. 16 is a detail view of the bottom portion of the pin elevator, showing the mechanism for conveying a pin in correct, base-foremost, position to the supporting plate of the elevator;

Figs. 17 to 19 are views similar to Fig. 16, showing, in successive stages, the operation of the mechanism for rejecting a pin which is conveyed to the elevator top-foremost;

Fig. 20 is a detail view, looking to the right of Figs. 16–19, of a part of the pin-rejecting mechanism;

Figure 21:
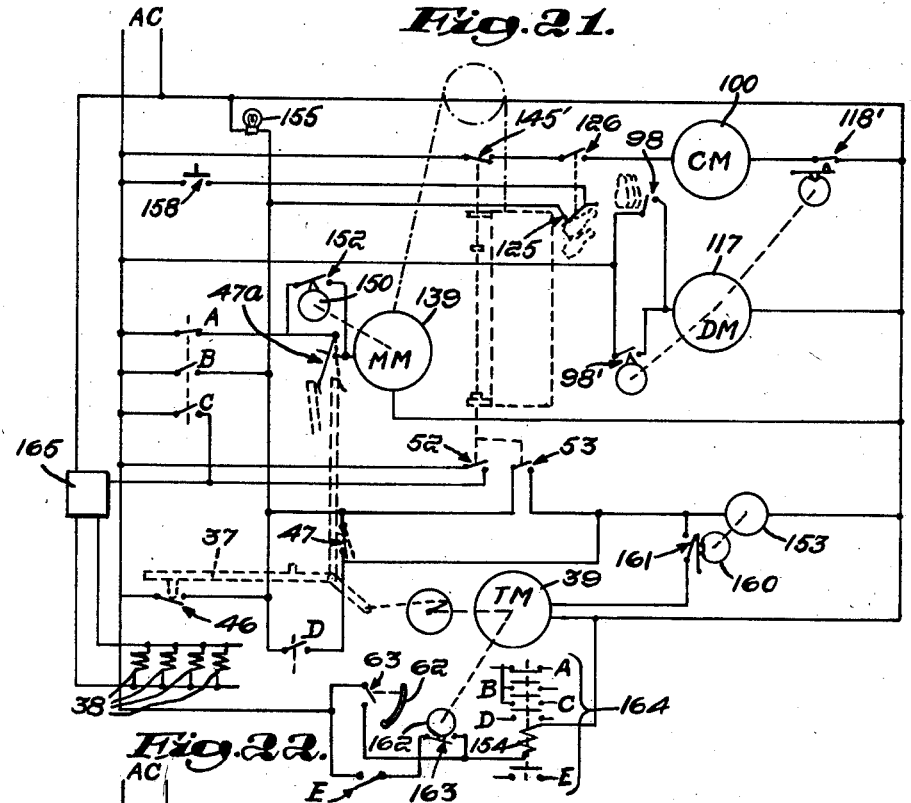
Figure 22:
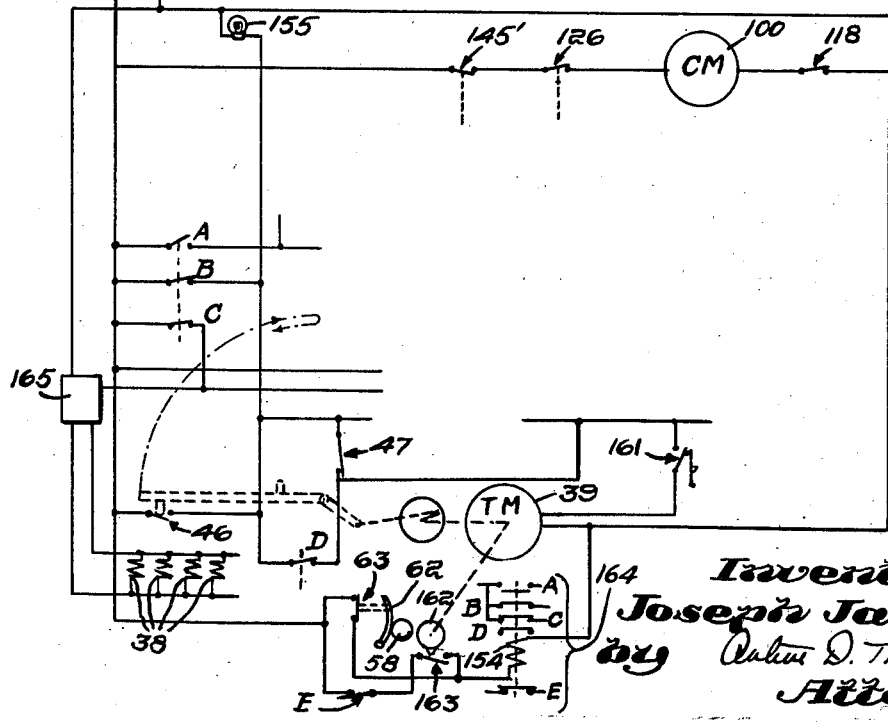

Fig. 21 is a circuit diagram showing the several motors and switches which are actuated successively to operate the machine, the circuit being in position to start the tray lift motor and reciprocate the magazine, for initial setting of ten pins, when a push button is manually closed; and Fig. 22 is a fragmentary diagram of the circuit, showing a switch being closed by impact of a bowling ball, to shift a drum switch, and thereby set the circuits for raising the tray to dump dead wood and for operating the conveyor mechanism, without moving the magazine.

Figure 2:
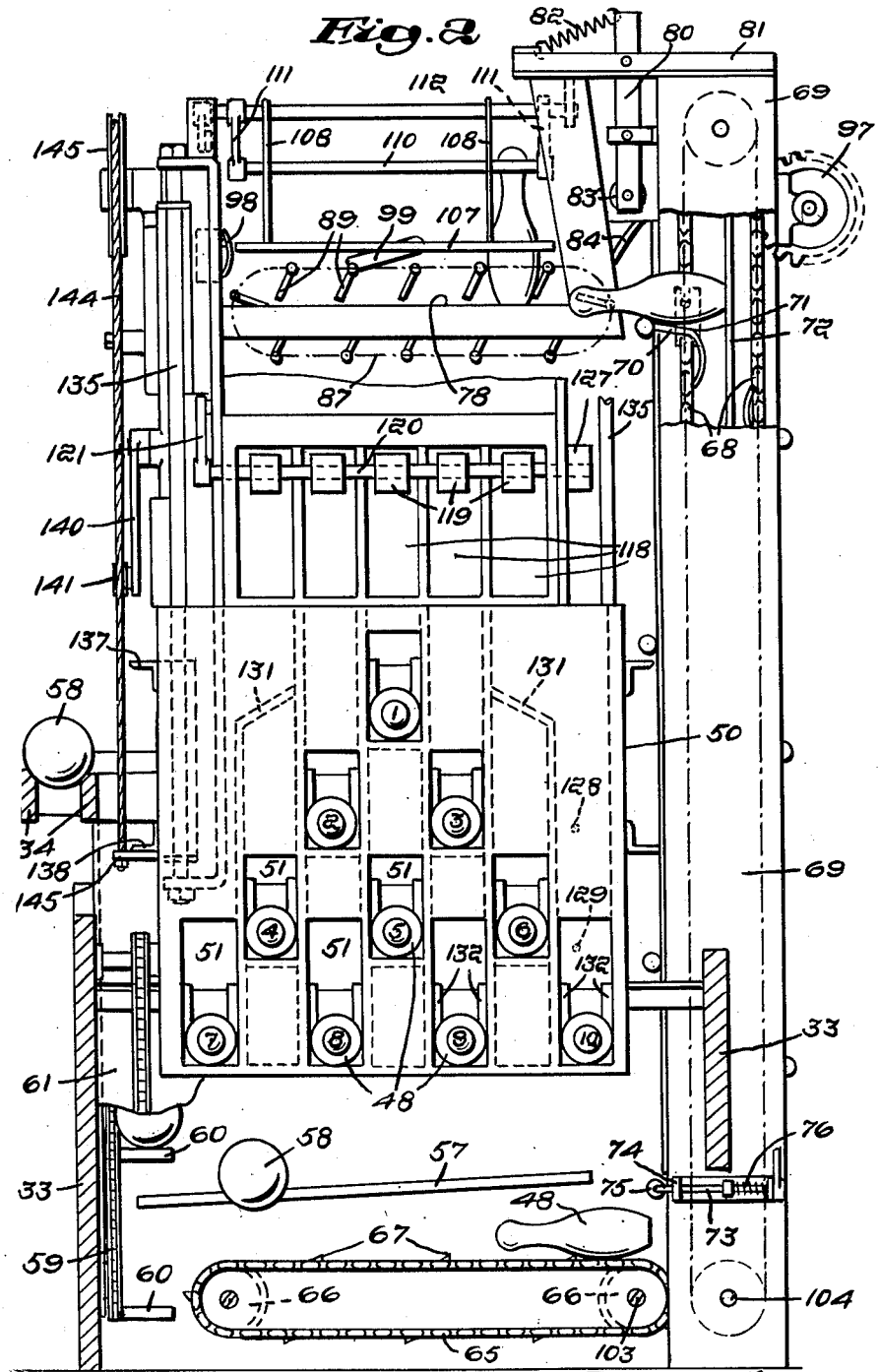
Fig. 2 is a vertical section, taken on line 2—2 of Fig. 4 and partly broken away, showing the loaded pin magazine in lowermost position.
Figure 3:
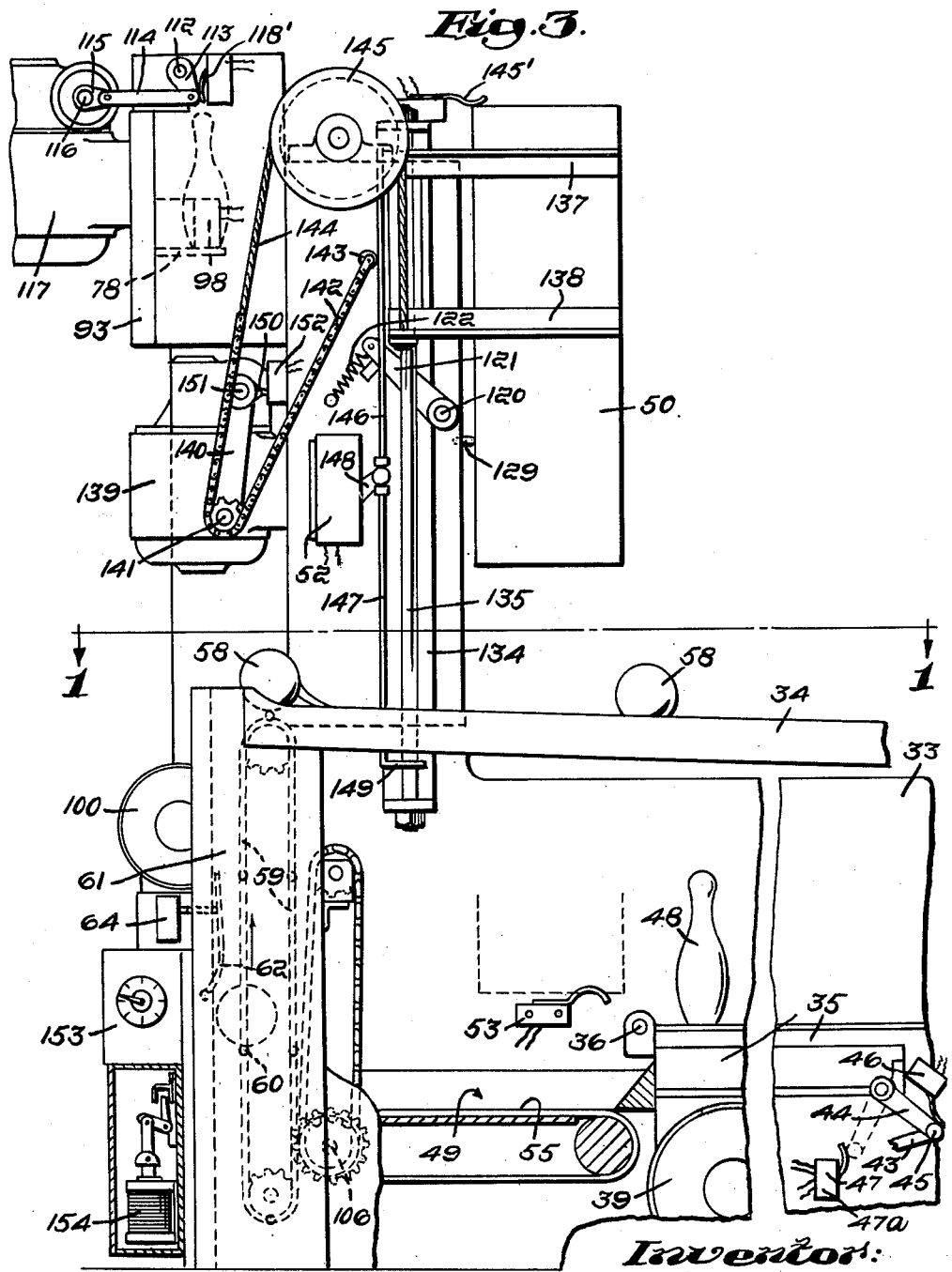
Fig. 3 is an elevation, partly broken away, looking to the right of Figs. 1 and 2, and showing the pin magazine in uppermost position.
Figure 4:
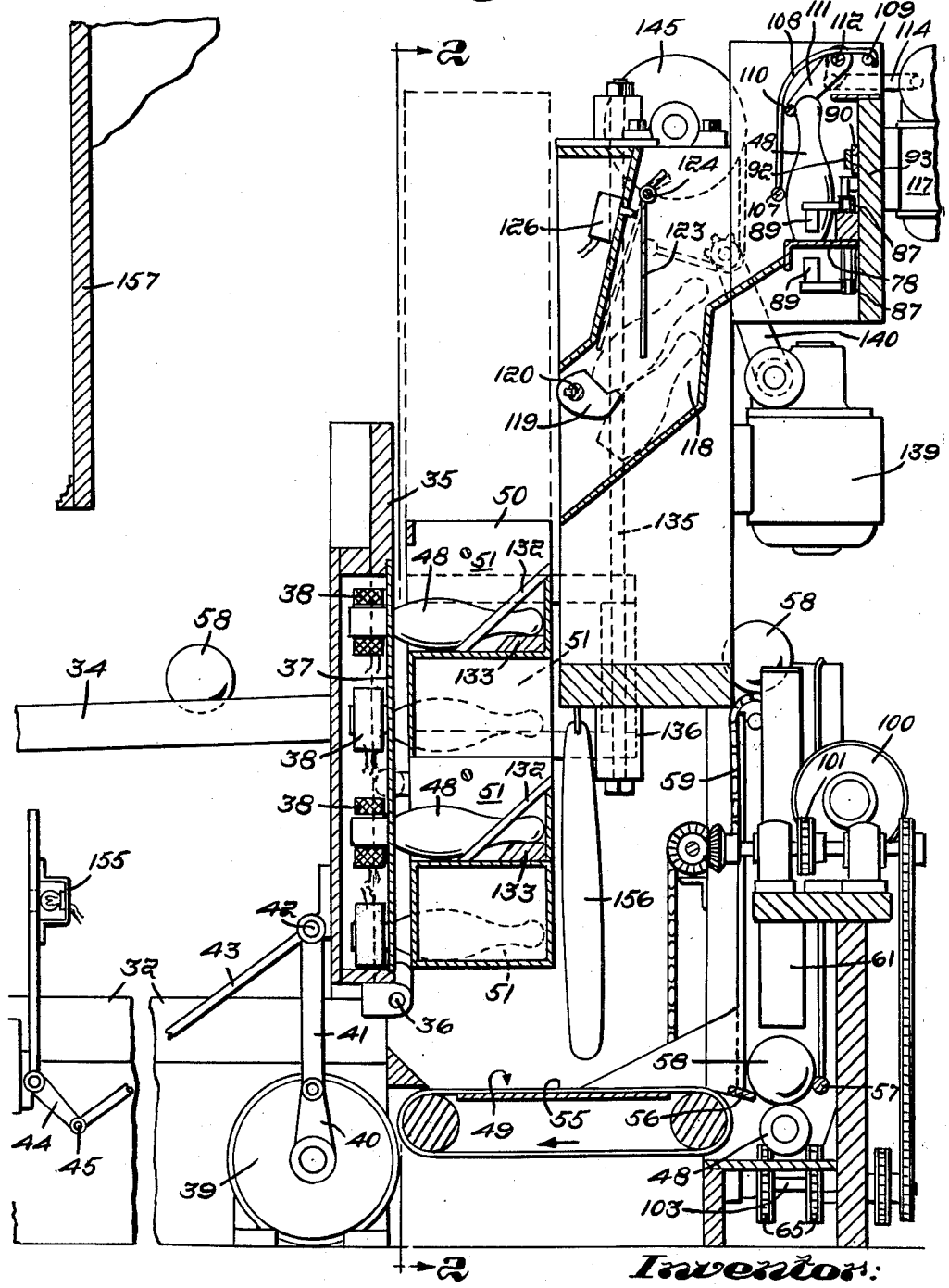
Fig. 4 is a vertical section, taken on line 4—4 of Fig. 1 and partly broken away, showing the pin magazine in lowermost position and showing the pin tray swung upwardly parallel to the magazine, in position to withdraw pins from the magazine compartments.

As shown in Figs. 1 to 4, the pin-setting machine is installed at the rear of a conventional bowling alley 31 having gutters 32, side walls 33, and a ball return ramp 34. In accordance with this invention, a section of the alley proper is cut away at its extreme rearward end, and a platform or pin tray, shown generally at 35, is fitted in place and suitably hinged at 36 to be swung from a normal horizontal position, flush with the surface of the alley (Figs. 1 and 3), to a vertical position at the extreme end of the alley (Fig. 4).

The tray has a flush, metal top plate 37, and a number of electromagnets 38 are suitably mounted under the plate in position to magnetize the plate as a whole, when energized. The tray is swung from one position to the other by a motor 39 operating a crank 40 and arm 41 pivoted at 42 to the bottom of the tray. The same pivot carries one or more rods 43 pivotally connected to complemental hinged links 44, preferably by a shaft 45 which also operates to open or close limit switches 46 and 47, respectively (Fig. 3), according to the position of the tray 35. Switch 46 is normally open. Switch 47 controls two circuits, holding one closed and the other open, according to the position of the tray, as hereafter explained.

Figure 1:
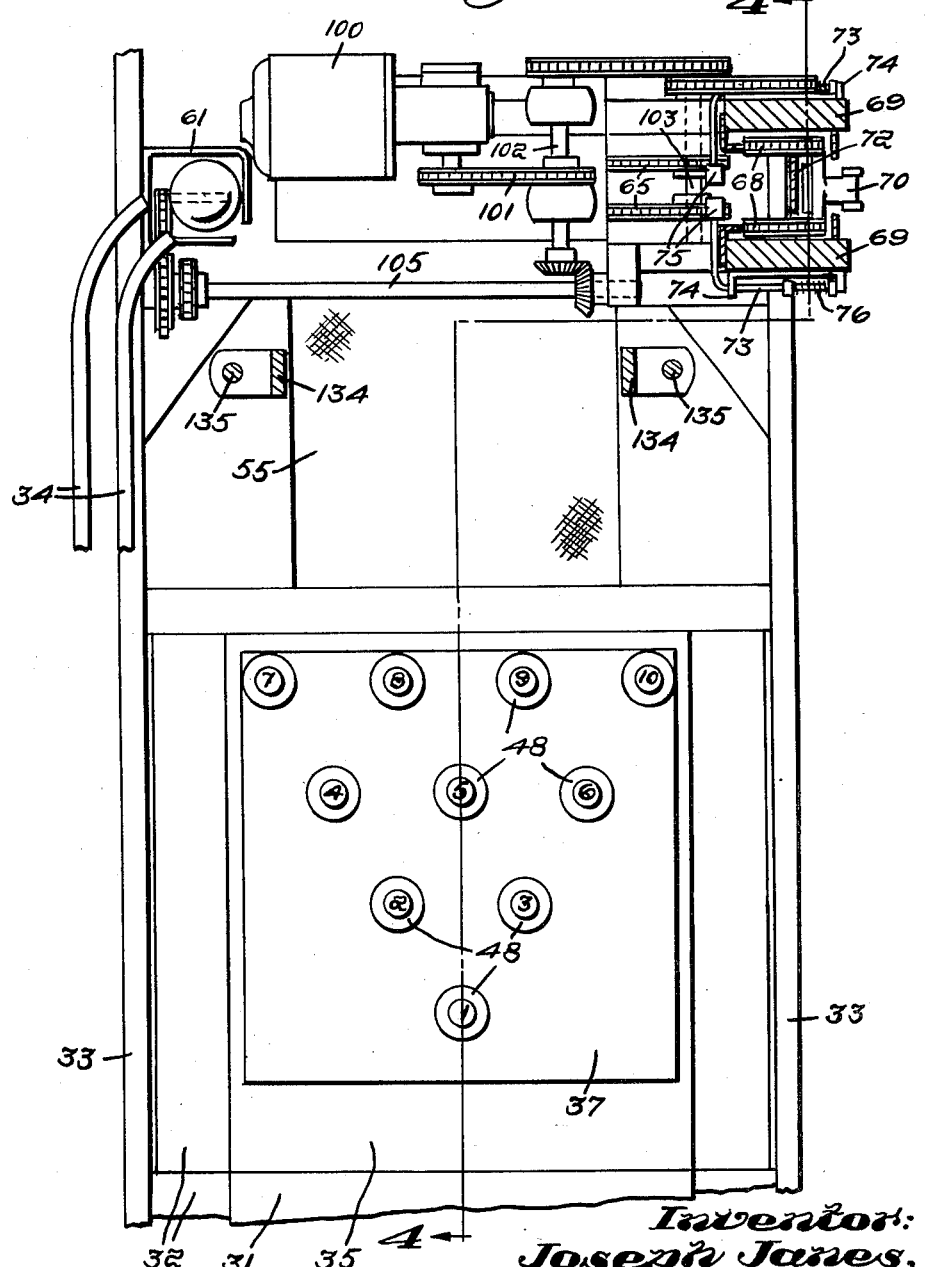
Fig. 1 is a plan view of the rear end of a bowling alley, taken on line 1—1 of Fig. 3, showing the movable, hinged pin tray in normal position with ten bottle-shaped pins in position for play, and showing the conveyor motor and portions of the ball nad pin conveyor mechanism.

In the normal position of the tray at the start of a game, the ten bowling pins 48 stand in the correct pattern on the plate 37, as shown in Fig. 1, the magnets being deenergized. The magnets become energized, however, when the tray is to be raised to the vertical position of Fig. 4, thereby to retain any upright pins thereon, while dumping any dead wood remaining on the tray into the pit 49 at the end of the alley.

The pins are set in starting position on the tray by pressing a button at the head of the alley to operate the tray lift motor 39, and magazine 50, as hereinafter described. During that operation, the tray is swung to vertical position facing the bases of the pins in the pin-loaded chambers 51 of the descending magazine 50 which starts down when the tray reaches the position of Fig. 4 and, on reaching its lowermost position, actuates a limit switch in box 52 (Fig. 3) to close the circuit to the magnets 38. Thereupon the set of pins in the magazine are attracted to and held in their proper pattern against the magnetized plate by metal washers or rings 48' secured in the bases of the respective pins (Fig. 9).

When the magazine reaches its lowermost position, the bottom of the magazine box strikes the arm of a limit switch 53 (Fig. 3) to close the circuit to the tray motor 39. The tray then swings downwardly to normal position (Figs. 1 and 3) with the pins mounted upright thereon, and the magnets 38 are automatically deenergized by opposite movement of the limit switch 52 which is reversed by the ascending magazine on reaching its uppermost position. As will later appear, another magazine-operated switch starts the motor 100 for the conveyor mechanism when the magazine reaches its uppermost position (Fig. 3).

The pins are thus set for the roll of the first ball by the bowler. That ball will usually knock down several of the standing pins, and the ball and some of the knocked down pins will fall into the pit 49 and on to a moving belt 55 which constitutes the floor of the pit. As best shown in Fig. 4, the upper course of the belt moves rearwardly of the pit over suitable rollers and conveys the ball and pins thereon toward and on to a ball slide consisting of spaced rails 56 and 57 extending transversely of the alley. These rails are so constructed and spaced apart that the pins deposited between them will fall downwardly between the rails; whereas, the ball 58 (of greater diameter) will be supported on the rails which incline downwardly toward the left of Fig. 2, so that the ball rolls to the left of the alley and into a moving elevator.

The ball elevator comprises a chain conveyor 59 travelling on upper and lower sprockets and having projecting, horizontal bars 60. The upwardly moving course of the chain 59 passes through an enclosed box-like tunnel 61 which has a suitable opening to receive a ball rolling down the rails 56, 57 and which holds the ball on one of the bars 60 while the bar is ascending, thereby carrying the ball upwardly to the inclined ramp 34 (Fig. 3) on which it rolls back to the head of the alley. In its upward travel on the conveyor chains, the ball wipes across a switch arm 62 (Fig. 3) which actuates a switch 63 (Figs. 21 and 22) in box 64 for a purpose to be explained.

The pins which fall between the rails 56 and 57 drop into a transverse conveyor at the rear of the pit. This conveyor comprises a pair of chains 65 operated by suitable sprockets 66 so that the upper course of the conveyor travels to the right of the pit, as viewed in Fig. 2; and lugs or cross slats 67 fixed to or connecting the respective chains assist in moving the pins to the right of the alley to a pin elevator, as indicated in that figure.

The pin elevator consists of a pair of conveyor chains 68, moving vertically between spaced upright members 69 at one side of the alley pit. Pin-supporting plates or buckets 70 are mounted between the conveyor chains by brackets 71 connected to the link pins thereof, as best shown in Fig. 10. A panel 72, mounted at right angles to the uprights 69, separates the ascending and descending courses of the conveyor and provides a guide for the base of the pins supported on the buckets 70, as the pins are conveyed upwardly, each in horizontal position, from the pit conveyor 65 to a pin rack at the top of the machine (Figs. 2 and 16).

The bottom of the pin elevator is equipped with mechanism which permits the elevator to receive only pins which are presented to the buckets base-foremost, and which rejects and tips over pins travelling top-foremost on the conveyor 65 at the back of the pit. This mechanism, best shown in Figs. 2 and 16–20, comprises pin-tumbling levers 73 pivotally mounted in brackets 74 on the outer sides of the uprights 69, a short distance above the path of travel of the pins on pit conveyor 65. The levers have inwardly directed ends terminating in cylindrical tips 75, and coiled springs 76 are arranged to urge said ends and tips to normal, horizontal position in front of the conveyor 68 (Figs. 1, 2 and 16), where they are maintained by stop arms 76' which abut the respective uprights 69 (Fig. 20). The tips 75 are thus disposed in spaced opposition, and swing upwardly and apart when engaged by an upwardly moving pin.

Thus, when a bowling pin is pushed base-foremost between the elevator chains 68 and against the guide panel 72, it is engaged by the advancing bucket 70 and lifted upwardly in horizontal position (Fig. 16), and the reduced neck of the pin passes between the lifted tips 75 of the spring-pressed lever arms 73, without displacing the pin inasmuch as its center of gravity is over the conveyor bucket which supports its heavy base portion.

However, when a pin is moved top-foremost between the elevator chains, its top end meets the panel 72 and the lighter top portion of the pin is engaged by the advancing bucket (Fig. 17) which tilts the pin toward an upright position. The top of the pin passes between the ends 75 of the raised lever arms (Fig. 18) which then spring back to normal position and engage the pin above its center of gravity (Fig. 19), and the moving pin conveyor 65 cooperates with the lever arms to tip or tumble the pin outwardly with respect to the elevator, so that its base is then presented to the elevator bucket, as shown in Fig. 16.

Pin-tumbling mechanism is also provided at the top of the elevator to pick the pins off the bucket and land them upright on a platform 77 leading to an overhead pin rack 78. This mechanism comprises a rod or roller 79 mounted between a pair of arms 80 pivoted in brackets 81, and normally held in upright position by a light tension spring 82 (Fig. 2). The rod has spaced hubs 83, one of which may have a frusto-conical surface (Fig. 7) to guide a pin tumbling over the rod.

When a pin on an elevator bucket approaches the top of the elevator 68, its neck strikes the rod 79 (Fig. 12) and restrains its upward movement. The outer edge of the advancing bucket 70 tilts the base of the pin upwardly causing the spring-pressed arms 80 to swing outwardly (Fig. 13), and then rides up over the bulging bottom portion of the pin, tumbling it over the rod (Fig. 14), so that it drops base down, guided by a curved bar 84 (Fig. 15), on to the wide end 77 of the rack platform 78 (Figs. 2 and 5) in upright position. Another inclined guide plate 85 (Fig. 5) maintains the pin upright and slides it in front of a pin-pusher plate or finger 86, which advances each pin landing on the platform into the pin rack.

The pin rack is designed to hold five pins in upright position on the platform 78 at the top of the machine, and comprises an endless chain 87 freely revolving in a vertical plane over idling sprockets 88 at the rear of the platform (Figs. 2, 4 and 6), with the upper course of the chain above the platform and the lower course below it. The chain carries uniformly spaced fingers 89 extending over the platform and providing stalls for the individual pins which are intermittently slid along the platform by the pusher plate 86. The chain moves in response to movement of the pins in the stalls, and the fingers 89 serve to space the pins and support them in upright position during such sliding movement.

The pusher 86 is carried by a reciprocating bar 90 which has slots 91 receiving screws 92 fastened to a backboard 93, so that the bar 90 is movable horizontally for a limited distance substantially equivalent to the distance between adjacent chain fingers 89 (Fig. 6). The pusher plate 86 projects over the platform 78 and is so disposed as to engage the side of a pin landing on the plaform (Fig. 7) and push it into the rack, to the left as viewed in Figs. 2 and 6.

Reciprocating bar 90 is pivotally connected by a link 94 to a crank arm 95 on the shaft 96 of a sprocket 97 which is engaged by the pin elevator chain 68 (Figs. 5 and 6), so that the bar is continuously reciprocated while the elevator is in operation. It will be apparent, however, that the rack chain 87 is moved only when a pin on the platform 78 is in position to be advanced by the pusher 86, to ensure that the rack is filled with five pins when a pin reaches the left hand end of the platform 78, as viewed in Figs. 2 and 5. At that instant, the foremost pin of the group of five strikes a switch arm 98 (Fig. 2) and operates a switch to stop the conveyor mechanism, and to start mechanism for dumping the racked pins into the pin chutes. Any tendency of the rack chain 87 to reverse its normal movement is preferably obviated by a pawl 99 pivotally mounted on the backward and having a recessed end which rides on top of the upper course of the chain and engages one of its link pins when forward movement of the chain stops (Figs. 2 and 6).

The various conveyor, elevator and pin-pusher mechanisms above described are all driven by a conveyor motor 100 through conventional gearing, shafting, sprockets and chains, as shown in Figs. 1–4. For example, the main drive chain 101 drives a shaft 102 which is connected by sprockets and chains to a shaft 103 which drives the sprockets of the pin conveyor chains 65 in the pit, and to a shaft 104 which drives the sprockets of the pin elevator chains 68; and which is connected through beveled gears to a shaft 105 for driving the sprockets of the ball elevator chain 59, and through another sprocket and chain drive, for driving a roller or shaft 106 of the pit conveyor belt 55. The conveyor motor 100 is automatically energized and deenergized as hereinafter explained in connection with the circuit diagrams of Figs. 21 and 22.

Supplementing the steadying support afforded to the racked pins by the fingers 89 of the rack chain, the pins are normally held on the platform during sliding movement by a movable guide rod 107 suspended by curved arms 108 from a fixed rod 109 on which the ends of the arms are pivotally hooked, so that the weight of the arms and movable rod yieldingly urge the latter downward against the sides of the pins (Fig. 4). Downward swinging movement of rod 107 is limited by the engagement of arms 108 against a pin-tipping or dumping bar 110 which is attached to a pair of levers 111 fixed on a shaft 112 mounted in suitable bearings parallel to the platform 78 and to the bar 110.

Shaft 112 is rotated by a crank 113, link 114 and crank 115 fixed to the shaft 116 of a dump motor 117, when that motor is energized by the closing of the switch controlled by the switch arm 98 which is actuated by contact with the foremost of the five pins in the rack, as previously explanied. Operation of the dump motor swings the levers 111 and tipping bar 110 downwardly (Fig. 4), and the bar strikes the tops of the pins in the rack and tips their bases off the platform 78, dumping the five pins into individual chutes 118. The movable guide rod 107 swings outwardly when the pins are thus tilted, allowing the pins to slide thereunder down the inclined chutes.

Although the switch arm 98 is released when the pins leave the rack, a cam-operated switch associated with dump motor 117 (and indicated at 98' in Fig. 21) keeps the motor running until its shaft and cranks return to the normal, inoperative position shown in Fig. 3, after one cycle of operation. In that position, the crank 113 engages a switch arm 118' and holds closed a limit switch in the circuit of the conveyor motor 110; but when the dump motor operates, switch 118' opens, so that the conveyor mechanisms can not operate when the pins are being dumped into the chutes.

The first set of five pins dumped into the chutes baseforemost are temporarily held in the lower portions of the respective chutes by cam-like gates 119 fixed to a shaft 120 in the upper portions of the discharge ends of the respective chutes (Figs. 2 and 4). The shaft is spring-tensioned by arm 121 and spring 122 (Figs. 2 and 3), so that the cam gates are urged clockwise in Fig. 4 and engage the bulging bottom portions of the pins resting on the bottom walls of the respective chutes and thus retain the pins therein, as indicated in that figure.

As soon as the switch 118' is closed, the conveyors again operate to carry another set of five pins (or as many as have been knocked down by the first or second ball, as the case may be) up to the pin rack; the dump motor again operates as soon as the rack is full, and the second set of five pins is dumped into the chutes; and those pins slide down on top of the set already retained in the chutes, and are stopped and retained by the cam gates 119 (Fig. 4).

A switch-actuating plate 123 is suspended from pivot rod 124 in at least two of the chutes, and hangs in the path of descent of the second pins which are dumped into those chutes, so that the impact of those pins swings the plates toward the upper walls of the chutes into engagement with button-actuated switches 125 and 126 (Figs. 4 and 5). These switches are so arranged that, when engaged by the plates 123, switch 125 closes and switch 126 opens; and, when not so engaged, switch 125 is normally opened and switch 126 is normally closed. The opening of switch 126 interrupts the circuit to the conveyor motor. The plates 123 may be installed in each of the chutes, for they also serve to guide the first set of dumped pins toward the desired positions on the bottom walls of the respective chutes, as aforesaid.

The shaft 120 of the cam gates is rotated to release the respective sets of pins in the chutes through actuation of a trip latch 127 by trip pins 128 and 129 fixed in spaced relation on the back of the magazine box 50 (Figs. 2, 5 and 8). A spring-pressed plate 130 is hinged on top of the latch so that the plate yields when struck underneath by the trip pins while the magazine is ascending (Fig. 8), and thus permits the pins to pass by without moving the latch. When the magazine is descending, however, the respective pins successively strike the top of the plate 130 and thus rotate the latch 127 and the shaft 120 on which it is fixed counterclockwise as shown in Fig. 8. The spring 122 returns the shaft and latch to normal position after each tripping actuation. Hence, the gates 119 are opened and the two sets of pins are successively released, to slide into appropriate compartments through appropriate openings in the back of the descending magazine box, so that the pins landing in the ten magazine compartments 51 form the desired pattern shown in Fig. 2. As the alley tray 35 is in elevated position while the magazine is descending, the bases of the sliding pins are stopped by contact with the tray plate 37.

The order in which the pins are received in the respective compartments is diagrammatically indicated in Fig. 11 which shows the four successive stages of the operation, as governed by the disposition of the entrance openings in the back of the magazine. The numbers on the pin diagrams of Fig. 11 and the corresponding numbers on the bases of the pins shown in Fig. 2 and the tops of the pins shown in Fig. 1, represent the conventional numbering of the pins when standing on the bowling alley.

At stage A, pins 8 and 9 of the first set of five in the chutes drop into openings leading directly to the innermost compartments in the bottom, or fourth row of the magazine. At stage B, pins 4, 5 and 6 of that set drop through openings leading to the three compartmeents in the next, or third, row.

At stage C, pins 2 and 3 of the second set of five in the chutes drop through openings to the two compartments in the third row of the magazine. And at stage D, pins 7 and 10 drop through openings leading indirectly to the outermost compartments of the bottom or fourth magazine row; and pin 1 simultaneously drops into the receiving compartment at the top or first row of the magazine.

It will be noted the magazine is wider than the total width of the pin chutes 118, and has seven files into which pins must fall to achieve the desired pin pattern therein. Hence, pins 7 and 10 drop first into the files occupied by pins 4 and 6, but are deflected to the outermost files of the magazine by inclined partitions 131 fixed near the tops of those files. Hence, when the tray plate 37 is magnetized to secure the pins, and then lowered to the alley, the pin pattern on the alley is conventionally correct, as shown in Fig. 1.

The magazine 50 is a box-like structure, substantially rectangular in shape and deep enough to receive the pins horizontally with their tips projecting slightly beyond the front of the partitioned compartments in which the pins rest in the lowered position of the magazine (Figs. 2 and 4). The ten, open-fronted compartments 51 are indicated in Fig. 2 by broken lines which define the partitions between them. The back of the magazine has openings to receive the two sets of five pins in the order explained above, the entrance openings at the backs of the magazine being spaced above the complemental exit openings at the front of the compartments. The respective compartments may have slides 132 at their opposite sides to guide the wide bottoms of the pins on to the floor thereof; and may have small blocks 133 resting on the floor at the backs thereof, to support the pin tops and maintain the horizontal position of the pins, as shown in Fig. 4.

The magazine is movable vertically between the discharge openings of the pin chutes 118 and the erected pin tray 35, as indicated in Fig. 4, which shows the magazine in its lowermost position in full lines and in its uppermost position in dotted lines, corresponding to the full line position of Fig. 3. For that purpose, a pair of stout metal uprights 134, securely mounted in spaced, parallel relation and in vertical position, respectively carry fixed vertical shafts or rods 135; sleeves 136 (Fig. 4) slide on the respective rods, and each sleeve has a pair of horizontal angle iron brackets 137, 138 (Fig. 3) fixed thereto in spaced relation; and the respective pairs of brackets are firmly secured to the opposite sides of the magazine 50.

The magazine is moved from its normal, elevated position, downwardly and then upwardly again, in a single cycle operation, by magazine motor 139 having a crank arm 140 carrying a sprocket 141 engaging a chain section 142, one end of which is fixed at 143 and the other end of which is connected to a cable 144 passing over a sheave at the top of the machine, and thence downwardly to the lower magazine bracket 138 where the cable end is suitably secured at 145 (Figs. 2 and 3). Hence, when the motor is actuated and the crank 140 swings through approximately 180°, the cable-chain suspension slackens gradually and the magazine drops smoothly to its lowermost position (Fig. 4); and the continued revolution of the crank through the remainder of 360° shortens the effective length of the cable and pulls the magazine upwardly to its starting position (Fig. 3). At that position, the top of the magazine contacts a switch arm 145' and closes a normally open limit switch in the circuit of the conveyor motor 100, which will then operate if the chute switch 126 is also closed.

Switch-actuating rods 146 and 147 are associated with the magazine brackets and with switch box 52. The respective rods have apertured end flanges slidable on the magazine-carrier rod 135. The flange of the upper rod 146 (hidden in Fig. 3) is engaged by the bracket 137 when the magazine reaches its topmost position to shift said rod and raise a switch arm 148. The corresponding flange 149 of the lower rod 147 is engaged by the lower bracket 138 when the magazine reaches the bottommost position to shift that rod and lower the switch arm 148. The arm 148 controls switch 52 (which may be a toggle switch) in the circuit of the tray magnets 38, as aforesaid.

A cam-like switch actuator 150 is mounted on the shaft 151 of the magazine motor, and engages a button-actuated switch 152 to hold the switch normally open when the motor is inoperative. When shaft 151 rotates, the switch closes and remains closed until the shaft rotates 360° (to maintain a shunt circuit to the magazine motor), when it again opens, stopping the motor 139. Hence, the magazine motor operates for one cycle only, and the magazine is moved downwardly and then upwardly to normal position. Slight slack in the chain 142 and cable 144 when the crank 140 has rotated 180° permits the magazine to hesitate at its lowermost position, while the pins are being withdrawn from its compartments by the magnetized tray plate.

As shown in Fig. 3, a clock-work timer 153 controlling the tray lift motor circuit, and a solenoid 154 controlling a multiple switch hereinafter described, may be installed at the back of the machine; but the location of these devices is unimportant. As shown in Fig. 4, a signal light 155 may be mounted at the side of the alley where it may be observed by the bowler; a heavy apron or buffer 156 may be suspended over the pit at the rear of the alley to prevent flying pins or balls from damaging the mechanism behind the pin; and a partition 157 may be installed transversely above the alley and ball-return ramp to conceal the upper portion of the mechanism behind the pit.

The operation of the machine is best explained in connection with the circuit diagram of Fig. 21, which indicates the initial pin-setting circuits, and Fig. 22 indicating more particularly the operative circuits for removing dead wood from the alley. In Fig. 21, the circuits are inoperative until push button 158 is pressed by the player, to set the pins (now in the chutes 118 and holding switch 125 closed) on the alley. The push button switch closes an A. C. circuit through switch 125 and switch 47 to the timer 153 which has a clockwork-operated cam 160 associated with a switch 161 in the circuit to the tray lift motor. As shown, the cam is inoperative, having a flat portion in engagement with an arm of that switch. On rotation of the cam, the switch is closed and held closed during the full rotation of the cam which is timed to rotate once during the cycle of operation of the tray 37. The timer and cam are preferably arranged to delay closing of switch 161 for approximately two seconds after the circuit to the timer is closed. If such delay is not required, the timer, cam and switch may be eliminated.

The closing of switch 161 actuates tray lift motor 39 (TM) and the tray is swung toward vertical position, immediately closing switch 46 which completes a second primary circuit to motor 39, through switches 47 and 161, so that push button 158 may be released as soon as the tray starts up. The signal light 155 is also energized by these circuits, and remains on until the tray returns to normal and opens switch 46. The tray motor shaft carries a cam 162 controlling a switch 163, but that switch does not function during the pin-setting operation, for the circuit in which it is located is otherwise open.

When the tray reaches vertical position, switch 47 is actuated to open the circuit to the tray lift motor and concomitantly close a circuit to the magazine motor 139 (MM). Although both circuits are controlled by the same switch, as aforesaid, the switch is identified as 47ᵃ in the magazine motor circuit of Fig. 21. That circuit also includes a switch A, forming part of the multiple or drum switch 164 controlled by the solenoid 154 which is inoperative in Fig. 21. The drum switch has five sets of complemental contacts which are respectively bridged or unbridged by complemental sector plates on a switch arm or shaft which is moved to shift all sector plates upon actuation of the solenoid. In Fig. 21, the contacts of switch A are closed, and the contacts of switches B, C, D and E are open.

Thus, the tray motor stops and the magazine motor starts as soon as the tray reaches vertical position to open switch 47 and close 47ᵃ. The magazine descends, successively tripping latch 127 to open chute gates 119 and successively release two sets of five pins each, which drop into the appropriate magazine compartments, as previously explained. When the magazine reaches the limit of its downward movement, it closes the normally open limit switches 52 and 53. Switch 52 closes a circuit through a rectifier 165 which supplies D. C. current to the magnets 38 under the tray plate. Switch 53 closes a secondary circuit through the timer to the tray motor 39. The two second timer delay permits the pins in the magazine to be firmly attached to the magnetized tray plate before the tray moves.

The tray thus swings back to normal position with the ten pins held upright in the correct pattern for the roll of the first ball down the alley; and switch 46 is opened to cut off the tray motor, and to shut off the signal light 155 to indicate to the bowler that he may roll the first ball. In the meantime, the magazine has moved upwardly. Although switch 47ᵃ opens when the tray starts down, a secondary circuit to the magazine motor is maintained through the cam-controlled switch 152 until the cam 150 has completed its cycle, when the switch 152 opens, stopping the motor and holding the magazine at its normal, uppermost position. Upon reaching that position, switch 52 also opens, cutting off the magnet circuit, and switch 145' is closed to complete a circuit to the conveyor motor 100 (CM); switch 126 now being closed because the pin chutes are empty; and switch 118' being normally closed.

The first ball rolled down the alley usually knocks down some of the pins, and carries some of those into the pit, and such pins with the ball are conveyed to the inclined ball track 56, 57 through which the spent pins drop on to the transverse pin conveyor and thence to the pin elevator and rack. The spent ball rolls to the ball elevator where it is moved upwardly and wipes across switch arm 62 and holds switch 63 closed for approximately four seconds. This action closes a circuit to the solenoid 154 which shifts the drum switch 164 to the position shown in Fig. 22, opening switch A (so that the magazine motor cannot operate) and closing switches B, C, D and E.

Switch B closes a third primary circuit to the tray motor 39 through the closed switch 47 and timer switch 161. Switch C closes a second primary circuit to the magnets 38 through rectifier 165. Switch D closes a secondary shunt circuit to the tray motor, and holds that circuit closed while switch 47 is opened upon elevation of the tray. Switch E closes a secondary shunt circuit to the solenoid, through cam-operated switch 163, effective after switch 63 opens when the ball rises past switch arm 62.

Hence, the tray is moved upwardly to dump into the pit any dead wood lying thereon, and immediately returns to normal position all standing pins on the tray being held in upright position by the magnetized tray plate. When the tray reaches normal position, cam 162 on the shaft of the tray motor opens switch 163, deenergizing solenoid 154 and restoring the drum switch contacts to the position of Fig. 21. The conveyor mechanism continues to operate, carrying spent pins to the rack 78.

If the first ball knocked down at least five pins, the rack will fill, closing switch 98 to actuate dump motor 117 (DM) to dump the five pins into the pin chutes, and to open cam-actuated switch 118' to stop the conveyor motor 100 until the dump motor has completed its cycle, whereupon the conveyor motor restarts.

If the first ball knocked down all ten pins, another set of five pins will thereupon be conveyed to the rack and dumped from the rack into the chutes, thereby closing switch 125 and opening switch 126 to stop the conveyor mechanism. The machine is now ready for the pin-setting operation to be started by pressing push button 158, as previously explained.

If the first ball did not score a strike by knocking down all ten pins, none of the pin chutes contains more than one pin, switch 126 remains closed, and the motor 100 operates the conveyor mechanism. The second ball is then rolled toward the standing pins remaining on the tray, the ball closes switch 63, and the dead wood dumping operation is repeated. In bowling duckpins, a third ball is then rolled against any pins still standing on the tray.

Extra pins are preferably kept in circulation through the machine so that ten pins may be ready for resetting in case a number of pins are left standing on the alley after the last permitted ball has been rolled in any single scoring frame or box, according to the rules of duckpins or tenpins. In that event, ten of the pins will be dumped into the chutes, to set the circuits in condition for initial pin-setting by pressing button 158. The tray will then be raised as aforesaid, but the tray magnets will not be energized until the magazine descends, so that any pins standing on the tray will be dumped into the pit as it swings upwardly. The number of extra pins so utilized may be varied as desired, but a total of twenty pins is practical for the games of duckpins and tenpins. For fivepins, a total of nine is preferred.

It will be understood that the sequence of operations just explained will be repeated for each scoring frame in using the machine herein described for bowling the games of tenpins or duckpins. In order to adapt the machine for playing the Canadian game of fivepins, the pin chutes and their associated gate mechanism and switch-actuating mechanism would be modified so that five pins fill the chutes, to close the switch 125 and open the switch 126; and the magazine would be modified to provide five compartments arranged to receive the pins from the chutes and hold them in the proper pattern to be transferred to the magnetized tray, when the machine is operated as herein explained.

It will also be understood, as aforesaid, that modifications may be made in the structural details of the apparatus herein described, within the scope of the invention as defined in the following claims. It is desirable, for example, that the metal plate 37 of the tray or platform 35 be surfaced with a thin sheet or film of a suitable material which will present the appearance of the alley floor yet not impair the pin-holding properties of the magnetized plate. A thin film of a plastic sold under the trade name Nylar, suitably applied to the top of the metal plate, is preferred for this purpose, but other films or laminae may also be employed.

The number of the magnets 38 may be varied, but it is preferred that the number be the same as the number of pins set on the tray, and that the magnets be located beneath the pin spots for optimum efficiency. It will be appreciated that, although the swing tray 35 includes portions of the alley gutters as well as the rear of the alley floor, the metal plate 37 sets into that portion of the alley floor occupied by the pins when set in proper pattern.

The rectifier 165 would, of course, be omitted, if the machine is operated by direct current, and the timer 159 may also be omitted, as aforesaid, if time delay is not required when the machine is started.

It will be observed that the improved machine is operated without the use of relays which have been employed in previous automatic pin-setting machines and which frequently get out of order and lay up the machine until repairs or adjustments have been made. The limit switches and drum switch of the machine herein disclosed are durable and efficient over long periods of use, and seldom require adjustment; but any needed adjustment may be made easily and quickly.

It will be observed, moreover, that the improved pin-setting machine does not require complicated pin-sorting mechanism. The pins are fed by gravity, in sets of five, from the overhead rack in which they are aligned at spaced intervals, to the spaced, inclined, stationary chutes, and thence into the compartments of the downwardly moving magazine in which the pins are sorted in correct pattern and from which they are withdrawn by the uplifted, magnetized tray which is then swung downwardly to normal position, flush with the floor of the alley, with the standing pins in proper position for play.

The aforesaid novel features of the pin-setting apparatus herein disclosed ensure smooth, efficient and rapid operation of the bowling alley, obviate the delays and mistakes incident to manual pin-setting, and contribute materially in reducing the mental hazards of the skillful bowler.

I claim:

1. In a bowling alley having a pit at the end of the alley proper, pins adapted to be set upright adjacent the end of the alley, and a ball return ramp, an automatic, pin-setting machine comprising a pin-supporting tray hinged to be swung from a normal horizontal position parallel to and flush with the surface of the alley to a vertical position substantially at right angles to the alley, a compartmented magazine movable in a vertical plane, a series of inclined chutes for delivering pins to the compartments of the magazine, a rack for supporting a plurality of pins in upright position disposed above the chutes and in operative association therewith, means for conveying pins from the pit to the rack, means for conveying balls from the pit to the ramp, means for dumping the pins standing on the rack into the respective chutes, means for releasibly retaining the pins in the chutes, means for swinging the tray upwardly to vertical position and downwardly to normal position, means for reciprocating the magazine in a path between the delivery ends of the chutes and the vertical tray, means for releasing the pins from the chutes so that they slide into the compartments of the magazine while the latter is moving downwardly, the pins having metal elements in their respective bases, electrical means for magnetizing the tray to attract the pins, withdraw them from the magazine and hold them at right angles to the surface of the tray, motors for operating the tray, the conveyor means, the magazine and the pin-dumping means, respectively, and electrically controlled means including circuits to said motors and to said tray-magnetizing means, and switches in said circuits associated with the movable elements of the machine for actuating said motors in sequence upon manual closing of a circuit to fill the magazine with pins and transfer the pins to the alley in upright position.

2. A pin-setting machine as described in claim 1, said electrically controlled means comprising switches associated with said chutes and actuated by pins retained in said chutes, one of said switches being closed when engaged by such pins to complete a circuit to the tray motor and another of said switches being opened when engaged by such pins to disconnect a circuit to the conveyor motor.

3. A pin-setting machine as described in claim 1, said electrically controlled means comprising limit switches associated with the movable tray, one of said switches being disposed in a circuit to the tray motor, normally open when the tray is horizontal and closed when the tray is moved upwardly from horizontal position; another of said switches being disposed in an auxiliary circuit to the tray motor, normally closed except when the tray reaches vertical position and opened when the tray is in such vertical position; and a third of said switches being disposed in a circuit to the magazine motor, normally open except when the tray is in vertical position and closed when the tray reaches vertical position.

4. A pin-setting machine as described in claim 1, said electrically controlled means comprising limit switches associated with the movable magazine, one of said switches being disposed in the circuit of the conveyor motor, normally open except when the magazine is in uppermost position and closed when the magazine reaches uppermost position; another of said switches being disposed in an auxiliary circuit to the tray motor, normally open execpt when the magazine is in lowermost position and closed when the magazine reaches lowermost position; and a third of said switches being disposed in a circuit to the tray-magnetizing means, also normally open except when the magazine is in lowermost position and closed when the tray reaches lowermost position.

5. A pin-setting machine as described in claim 1, said electrically controlled means comprising a cam switch actuated by the magazine motor and disposed in an auxiliary circuit to said motor, said switch being open when said motor is inoperative and closed during a single cycle operation of said motor.

6. A pin-setting machine as described in claim 1, said electricaly controlled means comprising a switch associated with the pin rack and actuated by contact of a pin when the rack is full, said switch being disposed in the circuit of the pin-dumping motor, normally open except when the rack is full and closed by the foremost end pin of a full rack to complete the circuit to the dump motor.

7. A pin-setting machine as described in claim 1, said electrically controlled means comprising switches associated with the pin-dumping motor, one of said switches being disposed in the circuit of the conveyor motor, normally closed when the pin-dumping motor is inoperative and open during a single cycle operation of said motor, so that the conveyor motor is inoperative while the pin-dumping motor is operating; and another of said switches being a cam switch actuated by said pin-dumping motor and disposed in an auxiliary circuit of said motor, normally open when the motor is inoperative and closed during a single cycle operation thereof, so that said motor will continue its cycle of operation even though another circuit to said motor is opened after the motor starts.

8. A pin-setting machine as described in claim 1, said electrically controlled means comprising a push button, a timer and a timer-actuated switch disposed in the circuit of the tray motor, whereby actuation of said motor is briefly delayed after the circuit is closed by pressing the push button.

9. A pin-setting machine as described in claim 1, said electrically controlled means comprising a switch actuated by contact of a ball while being conveyed from the pit to the ramp, a solenoid-actuated drum switch in the circuit of said ball-actuated switch and adapted to shift upon the closing of said switch to open a circuit to said magazine motor and to close auxiliary circuits to the tray motor and the tray-magnetizing means, and contacts actuated by the drum switch for holding closed an auxiliary circuit to said switch after the ball-actuated switch opens, whereby the shifting of the drum switch elevates the tray to dump dead wood thereon without moving the magazine.

10. A pin-setting machine as described in claim 9, said electrically controlled means further comprising a switch controlled by a cam on said tray motor, disposed in said auxiliary circuit to the drum switch, said cam switch being normally open except when said motor is operating and being closed while the motor is operating during a single cycle, whereby the drum switch is reshifted when the tray motor stops.

11. A machine for setting bottle-shaped bowling pins of the character described on an alley having a pit at the end thereof and a ball return ramp, comprising a pin-supporting tray hinged at said alley end and having a metal plate disposed substantially flush with the surface of the alley, means for swinging the tray from normal horizontal position to substantially vertical position, the pins having metal elements in their bases, electromagnets disposed beneath the metal plate of the tray so that the pins are held upright on the tray when placed with their bases toward said plate and when said magnets are energized, a vertically movable magazine having compartments for receiving and temporarily holding the pins horizontally in a desired pattern for transfer to the magnetized tray, means for moving the magazine from an uppermost position above the top of the tray when vertical to a lowermost position in spaced parallel relation to the vertical tray, whereby the pins may be withdrawn from said compartments by the magnetized tray, means for swinging the tray with the pins thereon to horizontal position, inclined pin chutes having outlets disposed in spaced parallel relation to the path of movement of the magazine on the side thereof opposite the vertical tray, means for conveying pins from the alley pit to the tops of the chutes and dumping them into the chutes, stop-means in the chutes for temporarily retaining the pins therein, and means actuated by the downwardly moving magazine for releasing said stop means to permit the pins to slide from the respective chutes into complemental compartments of the downwardly moving magazine.

12. A machine as described in claim 11, comprising a rack platform disposed above the upper ends of the chutes and adapted to receive an aligned group of pins corresponding in number to said chutes, the conveying means comprising an elevator for lifting successive pins in horizontal position, and means adjacent the top of the elevator for transferring successive pins onto said platform in upright position and sliding them successively along the platform in alignment, and the dumping means comprising devices for tipping the aligned pins off the platform so that they slide base foremost into said chutes.

13. A machine as described in claim 12, comprising means for moving spent pins transversely of the alley pit to the bottom of said elevator in horizontal, end foremost position, and means associated with the elevator for accepting pins conveyed to the elevator base foremost and rejecting pins conveyed top foremost by tumbling the latter pins off the elevator.

14. A machine as described in claim 12, in which the elevator has buckets supporting the bottom portions of successive pins and the means for transferring pins from the elevator to the platform comprises a transverse abutment disposed in the path of upward movement of the top portions of the pins and below the top of the elevator, whereby the pins are successively tumbled over the abutment and onto the rack platform in upright position.

15. A machine as described in claim 14, comprising a pusher plate adapted to engage successive pins landing on said platform and slide them along the platform, guide means associated with the platform for maintaining the sliding pins in upright position, and means for reciprocating the pusher plate to slide successive pins into the rack in alignment.

16. A machine as described in claim 15, said guide means comprising an endless chain supported for free movement in a vertical plane and having uniformly spaced, offset fingers extending over said platform into the path of movement of said pins, the space between adjacent fingers receiving a single pin, whereby the pins are uniformly spaced when the rack is full.

17. A machine as described in claim 16, comprising means limiting the capacity of the rack to five pins, the inclined chutes being five in number and each chute being of a size to receive two pins, one above the other, and the magazine having ten compartments.

18. A machine as described in claim 17, the stop means in the respective chutes being constructed and arranged to retain each set of five pins entering the chutes, and to release the pins in successive sets of five each.

19. A machine as described in claim 17, at least two of the chutes having a pivoted plate suspended therein and engageable by the second pins entering the respective chutes, and the respective plates being disposed in operative relation to complemental switch members whereby said switch members are actuated by movement of the plate when the chutes are full.

20. A machine as described in claim 17, the ten compartments of the magazine being arranged in seven vertical files, five of which are aligned with the five chutes and two of which are disposed outwardly at opposite sides of said group of five, the three center files each having two spaced compartments, the next adjacent files each having one compartment and an outwardly inclined ramp spaced above said compartment for deflecting one of the second set of five pins received from the chutes into a compartment in one of the outermost files.

21. In an automatic pin-setting machine, an overhead rack comprising a stationary platform adapted to support five upright pins in spaced alignment and having means for aligning said pins in spaced relation, five stationary chutes inclining downwardly from said rack, means for dumping said pins base foremost into the respective chutes, releasable means for retaining the pins in the chutes, a vertically movable magazine having at least five horizontal compartments, arranged in vertical files and horizontal rows and adapted to receive said pins in a prescribed pattern, means for reciprocating the magazine in a path adjacent the outlets of said chutes, and means for releasing said releasable means while the magazine is descending, whereby the pins in said chutes slide into selected compartments of the descending magazine.

22. In an automatic pin-setting machine as described in claim 21, a pin-supporting tray movable to vertical position in spaced alignment with said magazine when the magazine is in its lowermost position, said tray having magnetic means for attracting the bases of pins in said magazine having metal inserts in their bases, and means for moving the tray from said vertical position to a horizontal position, thereby to withdraw the pins from the magazine.

23. In an automatic pin-setting machine as described in claim 21, said releasable means comprising a latch carrier, and latches fixed to the carrier and disposed in the respective chutes, and said releasing means comprising trip means for moving said carrier to move said latches, and means associated with the movable magazine for actuating said trip means while the magazine is descending.

24. In an automatic pin-setting machine as described in claim 21, said chutes being of a size to accommodate two sets of five pins, said magazine having ten compartments, and said releasable means being constructed and arranged to retain two pins in each chute and to release said pins in succession, whereby one set of five pins is first released and the second set of five pins is thereafter released.

25. In an automatic pin-setting machine as described in claim 24, said releasable means comprising a latch carrier, latches fixed to said carrier and disposed in the respective chutes for retaining two pins in each chute, trip means for moving said carrier to move said latches, and members projecting from said magazine in spaced vertical relation and successively engageable with said trip means while the magazine is descending, whereby said trip means are actuated to release one set of five pins and thereafter to release the other set of five pins.

References Cited in the file of this patent

UNITED STATES PATENTS

| | | |
|---|---|---|
| 1,181,649 | Downey | May 2, 1916 |
| 1,231,863 | Downey | July 3, 1917 |
| 1,297,951 | Wheeler | Mar. 18, 1919 |
| 1,896,383 | White | Feb. 7, 1933 |
| 2,450,249 | Murphy | Sept. 28, 1948 |
| 2,743,927 | Patterson | May 1, 1956 |